(12) United States Patent
Donham (10) Patent No.: US 8,325,203 B1
(45) Date of Patent: Dec. 4, 2012

(54) OPTIMAL CACHING FOR VIRTUAL COVERAGE ANTIALIASING

(75) Inventor: Christopher D. S. Donham, San Mateo, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1094 days.

(21) Appl. No.: 11/893,405

(22) Filed: Aug. 15, 2007

(51) Int. Cl.
G09G 5/00 (2006.01)

(52) U.S. Cl. .................. 345/611; 345/613; 345/614

(58) Field of Classification Search .................. 345/611, 345/613, 614, 506, 557
See application file for complete search history.

(56) References Cited

U.S. PATENT DOCUMENTS

| | | | |
|---|---|---|---|
| 4,687,326 A | 8/1987 | Corby, Jr. | |
| 4,727,471 A | 2/1988 | Driels et al. | |
| 4,899,318 A | 2/1990 | Schlumberger et al. | |
| 5,038,383 A | 8/1991 | Usumoto et al. | |
| 5,386,509 A | 1/1995 | Suzuki et al. | |
| 5,438,656 A | 8/1995 | Valdes et al. | |
| 5,442,733 A | 8/1995 | Kaufman et al. | |
| 5,487,172 A | 1/1996 | Hyatt | |
| 5,550,933 A | 8/1996 | Stetten | |
| 5,553,161 A | 9/1996 | Fischer | |
| 5,647,018 A | 7/1997 | Benjamin | |
| 5,659,671 A | 8/1997 | Tannenbaum et al. | |
| 5,774,133 A | 6/1998 | Neave et al. | |
| 5,818,456 A | 10/1998 | Cosman et al. | |
| 5,877,768 A | 3/1999 | Jain | |
| 5,880,736 A | 3/1999 | Peercy et al. | |
| 5,949,424 A | 9/1999 | Cabral et al. | |
| 6,023,279 A | 2/2000 | Sowizral et al. | |
| 6,046,744 A | 4/2000 | Hoppe | |
| 6,057,852 A | 5/2000 | Krech, Jr. | |
| 6,163,319 A | 12/2000 | Peercy et al. | |
| 6,172,679 B1 | 2/2001 | Lim | |
| 6,222,937 B1 | 4/2001 | Cohen et al. | |
| 6,226,005 B1 | 5/2001 | Laferriere | |
| 6,249,287 B1 | 6/2001 | Yamrom | |
| 6,266,064 B1 | 7/2001 | Snyder | |
| 6,292,192 B1 | 9/2001 | Moreton | |
| 6,307,555 B1 | 10/2001 | Lee | |
| 6,407,736 B1 | 6/2002 | Regan | |
| 6,426,755 B1 | 7/2002 | Deering | |
| 6,437,793 B1 | 8/2002 | Kaasila | |
| 6,452,595 B1 | 9/2002 | Montrym et al. | |
| 6,469,707 B1 | 10/2002 | Voorhies | |
| 6,587,104 B1 | 7/2003 | Hoppe | |
| 6,621,925 B1 | 9/2003 | Ohmori et al. | |

(Continued)

OTHER PUBLICATIONS

Kilgariff et al., "The GeForce 6 Series GPU Architecture", Excerpted from GPU Gems 2, 2005 by nVidia Corporation, Chapter 30.

(Continued)

*Primary Examiner* — Hau Nguyen (57) ABSTRACT

In a graphics pipeline of a graphics processor, a method for caching pixel data. The method includes receiving a graphics primitive for rasterization in a raster stage of a graphics processor and rasterizing the graphics primitive to generate a plurality of tiles of pixels related to the graphics primitive. A subpixel sample group related to each of the plurality of tiles is determined. The plurality of tiles and the corresponding plurality of subpixel sample groups are stored into a frame buffer memory. A set of tiles and a set of corresponding subpixel sample groups from the frame buffer memory are stored in a rasterization cache, wherein the rasterization cache is configured for access by the raster stage to enable a subpixel anti-aliasing operation.

20 Claims, 9 Drawing Sheets

U.S. PATENT DOCUMENTS

| | | | |
|---|---|---|---|
| 6,650,325 B1 * | 11/2003 | Voorhies et al. | 345/426 |
| 6,664,955 B1 | 12/2003 | Deering | |
| 6,668,082 B1 | 12/2003 | Davison et al. | |
| 6,687,396 B1 | 2/2004 | Sugiura et al. | |
| 6,720,975 B1 | 4/2004 | Dietrich, Jr. | |
| 6,734,861 B1 | 5/2004 | Van Dyke et al. | |
| 6,828,985 B1 | 12/2004 | Long et al. | |
| 6,831,658 B2 | 12/2004 | Taneja et al. | |
| 6,927,781 B1 | 8/2005 | Kong | |
| 6,943,791 B2 | 9/2005 | Pascual et al. | |
| 6,947,057 B2 | 9/2005 | Nelson et al. | |
| 6,980,209 B1 | 12/2005 | Donham et al. | |
| 6,982,723 B1 | 1/2006 | Szymaniak | |
| 6,995,505 B2 | 2/2006 | Kim et al. | |
| 6,999,076 B2 | 2/2006 | Morein | |
| 6,999,100 B1 | 2/2006 | Leather et al. | |
| 7,030,878 B2 | 4/2006 | Xu et al. | |
| 7,034,823 B2 | 4/2006 | Dunnett | |
| 7,098,924 B2 | 8/2006 | Prokopenko et al. | |
| 7,126,615 B2 * | 10/2006 | Liao | 345/613 |
| 7,129,941 B2 | 10/2006 | Deering et al. | |
| 7,333,119 B1 | 2/2008 | King et al. | |
| 7,372,471 B1 | 5/2008 | Hutchins | |
| 7,408,553 B1 | 8/2008 | Toksvig et al. | |
| 7,425,960 B2 | 9/2008 | Dowling et al. | |
| 7,633,506 B1 | 12/2009 | Leather et al. | |
| 7,652,677 B2 | 1/2010 | Dorbie et al. | |
| 7,684,641 B1 | 3/2010 | Toksvig | |
| 7,817,165 B1 | 10/2010 | Donham et al. | |
| 7,876,332 B1 | 1/2011 | Donham et al. | |
| 8,004,522 B1 | 8/2011 | Toksvig et al. | |
| 8,040,357 B1 | 10/2011 | Hutchins et al. | |
| 2002/0015041 A1 | 2/2002 | Naegle et al. | |
| 2002/0054712 A1 | 5/2002 | Sun | |
| 2002/0118875 A1 | 8/2002 | Wilensky | |
| 2003/0095134 A1 | 5/2003 | Tuomi et al. | |
| 2003/0183692 A1 | 10/2003 | Dickson et al. | |
| 2004/0012610 A1 | 1/2004 | Taneja et al. | |
| 2004/0161146 A1 | 8/2004 | Van Hook et al. | |
| 2004/0174376 A1 | 9/2004 | Deering | |
| 2004/0183801 A1 | 9/2004 | Deering | |
| 2004/0207622 A1 | 10/2004 | Deering et al. | |
| 2004/0257607 A1 | 12/2004 | Gupta et al. | |
| 2005/0212806 A1 * | 9/2005 | Koselj et al. | 345/522 |
| 2005/0225554 A1 | 10/2005 | Bastos et al. | |
| 2005/0253861 A1 | 11/2005 | Hutchins et al. | |
| 2005/0280648 A1 | 12/2005 | Wang et al. | |
| 2006/0077209 A1 | 4/2006 | Bastos et al. | |
| 2006/0103663 A1 | 5/2006 | Collodi | |
| 2006/0170703 A1 | 8/2006 | Liao | |
| 2006/0188163 A1 * | 8/2006 | Elder | 382/232 |
| 2007/0002068 A1 | 1/2007 | Whitted et al. | |
| 2007/0008336 A1 | 1/2007 | Bastos et al. | |
| 2007/0018988 A1 | 1/2007 | Guthe | |
| 2007/0047790 A1 | 3/2007 | Dewaele | |
| 2007/0097145 A1 | 5/2007 | Akenine-Moller | |
| 2007/0146366 A1 | 6/2007 | Seetharamaiah et al. | |
| 2007/0165035 A1 | 7/2007 | Duluk, Jr. et al. | |
| 2007/0291030 A1 | 12/2007 | Fowler et al. | |

OTHER PUBLICATIONS

The IEEE standard for floating point arithmetic; at URL= http://www.psc.edu/general/software/packages/ieee/ieee.php; printed May 18, 2011; 2 pages.

Tomas Akenine-Moller and Eric Haines, "Real-Time Rendering", 2nd ed., 2002, A.K. Peters Ltd., pp. 92-99.

* cited by examiner

OPTIMAL CACHING FOR VIRTUAL COVERAGE ANTIALIASING

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms and various rasterization methods have been developed for computing from a graphics primitive based description to a pixel based description (e.g., rasterizing pixel to pixel per primitive) in a way such that all pixels within the primitives comprising a given 3-D scene are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive.

Other traditional methods involve utilizing per pixel evaluation techniques to closely evaluate each of the pixels comprising a display and determine which pixels are covered by which primitives. The per pixel evaluation involves scanning across the pixels of a display to determine which pixels are touched/covered by the edges of a graphics primitive.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

Various traversal algorithms have been developed for moving from pixel to pixel in a way such that all pixels within the primitive are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive. Each time this shift is executed, pixels or texture values are stored which were not positioned adjacent to pixels or texture values processed immediately beforehand. Therefore, such distant pixels or texture values have a greater chance of belonging to different memory access blocks, making such access inefficient.

Less efficient access imposes a number of performance penalties on the graphics rendering system. Operating on distant pixels or distant texture values leads to a large number of pixel data fetches or texture data fetches from the frame buffer memory. This causes a correspondingly large amount of frame buffer memory bandwidth traffic. The excess frame buffer memory traffic contends with other graphics function units that need to access the frame buffer memory. The performance penalty is even more severe in those cases where anti-aliasing is implemented. For example, many anti-aliasing techniques utilize a plurality of subpixel sample points in order to more accurately determine fragment coverage per pixel. What is particularly problematic is the fact that the multiple number of sample points per pixel can greatly increase the amount of excess frame buffer memory traffic.

Thus, a need exists for a rasterization process that can ensure needed graphics rendering data (e.g., texture values, normal maps, etc.) can be maintained in memory for an efficient access by the GPU.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for caching pixel data in a graphics pipeline of a graphics processor. The method includes receiving a graphics primitive (e.g., triangle) for rasterization in a raster stage of a graphics processor and rasterizing the graphics primitive to generate a plurality of tiles of pixels (e.g., four pixels per tile, etc.) related to the graphics primitive. Generally, a tile is related to the graphics primitive if it has at least some degree of coverage by the graphics primitive. A subpixel sample group related to each of the plurality of tiles is also determined. The plurality of tiles and the corresponding plurality of subpixel sample groups are stored into a frame buffer memory. A set of tiles and a set of corresponding subpixel sample groups from the frame buffer memory are stored in a rasterization cache, wherein the rasterization cache is configured for access by the raster stage to enable a subpixel anti-aliasing operation.

In this manner, the rasterization cache is configured to maximize locality of reference advantages by keeping frequently accessed pixel data at hand in low latency cache memory. For example, the rasterization cache can function in conjunction with particular traversal algorithms to maximize the probability that needed pixel data (e.g., subpixel sample points, etc.) will reside within the rasterization cache as opposed to the frame buffer. For example, the set of tiles and the set of corresponding subpixel sample groups that are stored in the rasterization cache can be selected to maximize access to the rasterization cache as opposed to access to the frame buffer memory during the subpixel anti-aliasing operation. Additionally, the rasterization cache can utilize intelligent cache line eviction policies in order to provide an optimal benefit from a limited amount of storage space.

In one embodiment, the present invention is implemented as a computer system configured for optimal caching for virtual coverage anti-aliasing. The computer system includes a system memory, a central processor unit coupled to the system memory, and a graphics processor unit communicatively coupled to the central processor unit. A set-up unit is included within the graphics processor unit for generating polygon descriptions of a graphics primitive, and a rasterizer unit is coupled to the set-up unit for generating a plurality of tiles of pixels related to the graphics primitive and determining a subpixel sample group related to each of the plurality of tiles. A rasterization cache is coupled to the rasterizer unit for storing a set of tiles and a set of corresponding subpixel sample groups, wherein the rasterization cache is configured for access by the raster stage to enable a virtual coverage anti-aliasing operation. The set of tiles and the set of corresponding subpixel sample groups that are stored in the rasterization cache are selected to maximize access to the rasterization cache as opposed to access to the frame buffer memory during the virtual coverage anti-aliasing operation.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
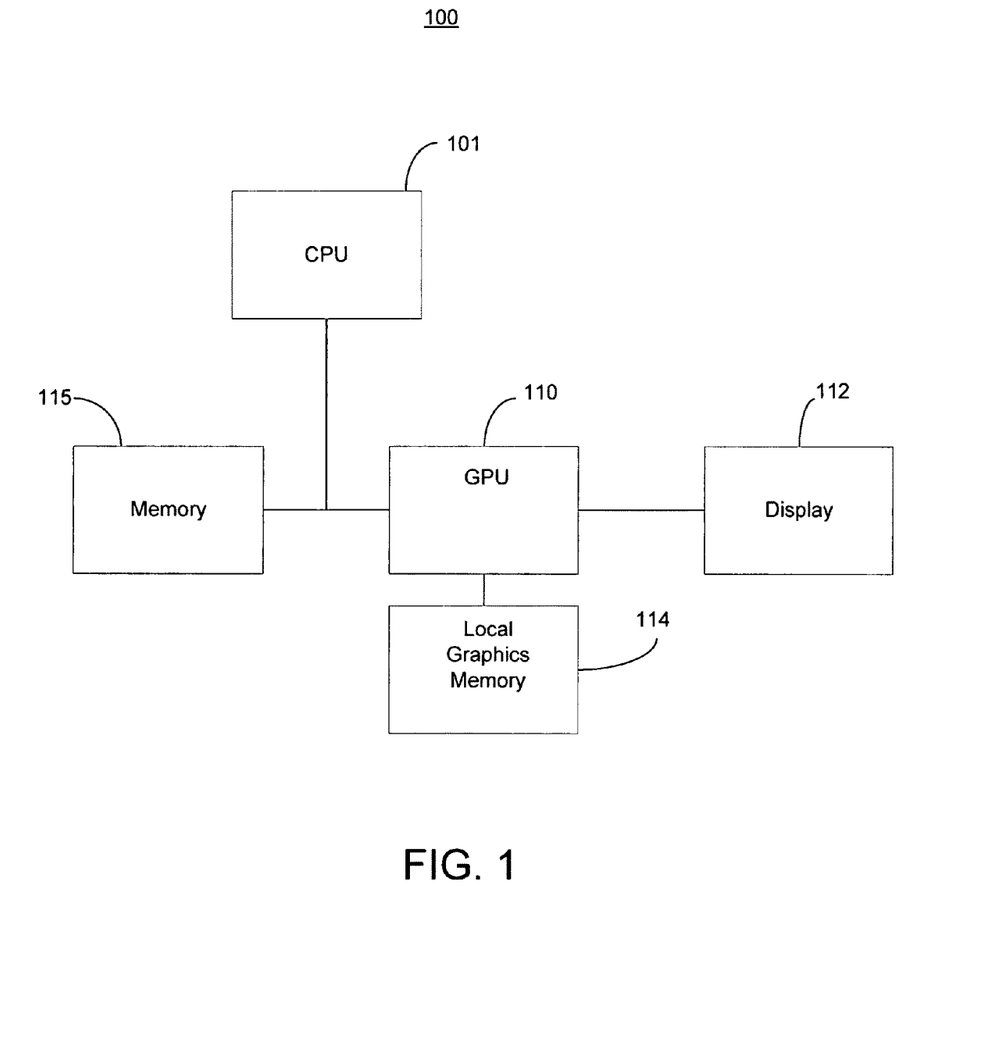
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention

Embodiments of the present invention implement a method and system for caching pixel data in a graphics pipeline of a graphics processor (e.g., GPU 110) to facilitate virtual coverage anti-aliasing. The method includes receiving a graphics primitive (e.g., triangle) for rasterization in a raster stage of the graphics processor 110 and rasterizing the graphics primitive to generate a plurality of tiles of pixels (e.g., four pixels per tile, etc.) related to the graphics primitive. Generally, a tile is related to the graphics primitive if it has at least some degree of coverage by the graphics primitive. A subpixel sample group related to each of the plurality of tiles is also determined. The plurality of tiles and the corresponding plurality of subpixel sample groups are stored into a frame buffer memory (e.g., local graphics memory 114). A set of tiles and a set of corresponding subpixel sample groups from the frame buffer memory 114 are stored in a low latency high bandwidth rasterization cache, wherein the rasterization cache is configured for access by the raster stage to enable a subpixel anti-aliasing operation. Embodiments the present invention and their benefits are further described below.

Figure 2:
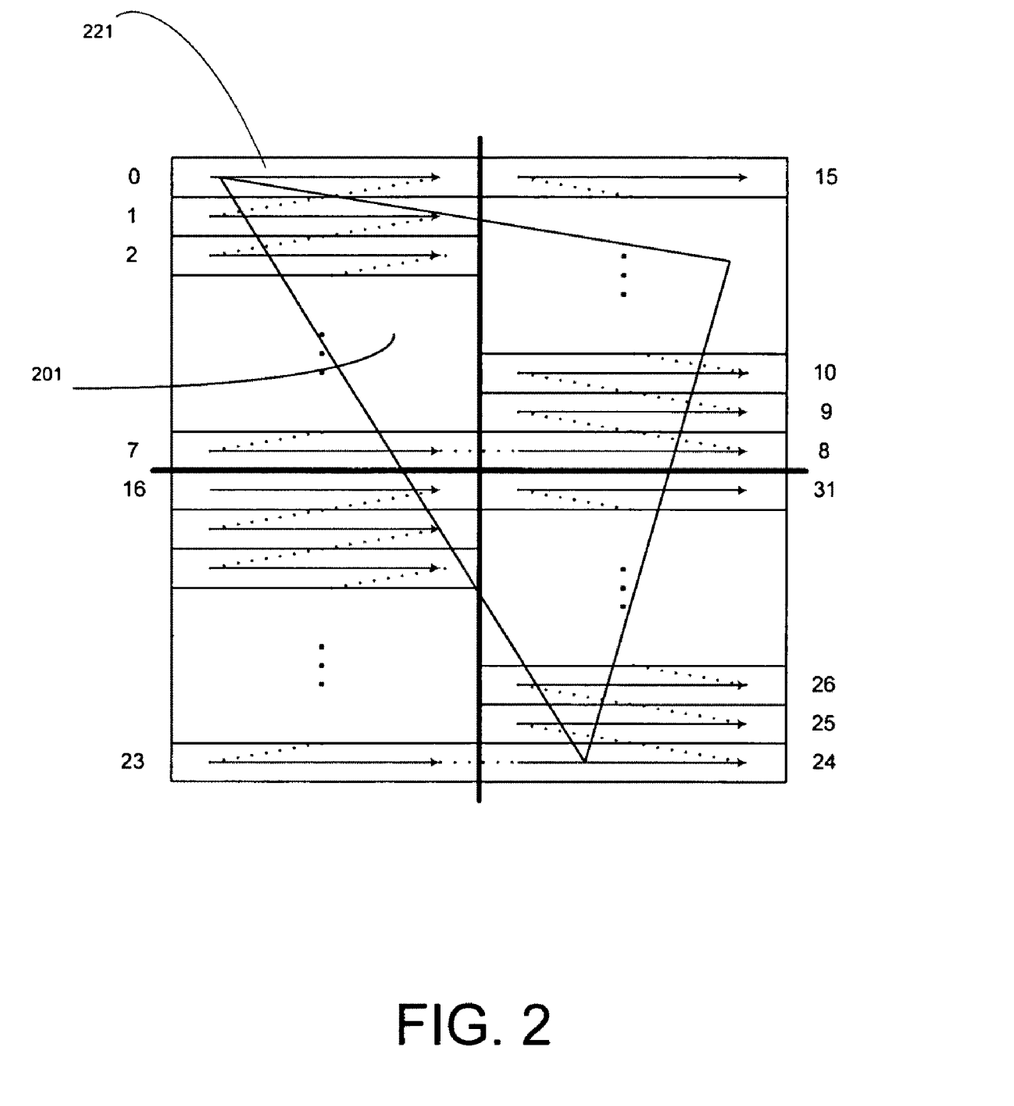
FIG. 2 shows a diagram depicting a grid of pixels being rasterized using a traversal pattern 221 in accordance with one embodiment of the present invention.

FIG. 2 shows a diagram of a rasterization process for a triangle 201 in accordance with one embodiment of the present invention. The FIG. 4 embodiment shows a traversal pattern 221 where the raster unit visits all tiles/pixels on a 2D area of the triangle 201 by sequentially scanning the lines of an upper left quadrant (e.g., lines 0 through 7), an upper right quadrant (e.g., lines 8 through 15), a lower left quadrant (e.g., lines 16 through 23), and a lower right quadrant (e.g., lines 24-31).

The objective of the rasterization process is to determine which pixels have at least some degree of coverage by a given primitive. These pixels are then passed on to the subsequent stages of the graphics pipeline to be rendered into the appropriate fragment data and stored into the frame buffer memory for display.

In one embodiment, as depicted in FIG. 2, the traversal pattern 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field.

Thus, as depicted in FIG. 2, the rasterization pattern implements a serpentine pattern that folds back and forth along a predominant axis. In the FIG. 2 example, the predominant axis is vertical. Consequently, the lower-level axis shows a case where the rasterization is left-to-right for rows of 8 tiles/pixels. The higher level motion is along the predominant vertical axis, where row to row scanning proceeds vertically, for example, from row 0 to row 7. For the first column (e.g., upper left quadrant), the row to row motion is downward vertical. For the second column (e.g., upper right quadrant), the row to row motion is upward vertical. In this manner, FIG. 2 shows an example of a vertical boustrophedonic sequence using the folded path described above to ensure that an average distance from a generated pixel to recently previously generated pixels is relatively small.

In the present embodiment, the traversal pattern 221 is implemented on a tile-by-tile basis (e.g., from one generated tile to the next generated tile) although it should be noted that the traversal pattern can be implemented on a pixel-by-pixel basis.

The optimized traversal pattern 221 has advantages for maintaining a cache of relevant data and reducing the memory requests required for frame buffer access. For example, generating pixels that are near recently generated pixels is important when recent groups of pixels and/or their corresponding depth values, stencil values, and the like are kept in memories of a limited size (e.g., cache memories, etc.).

Figure 3:
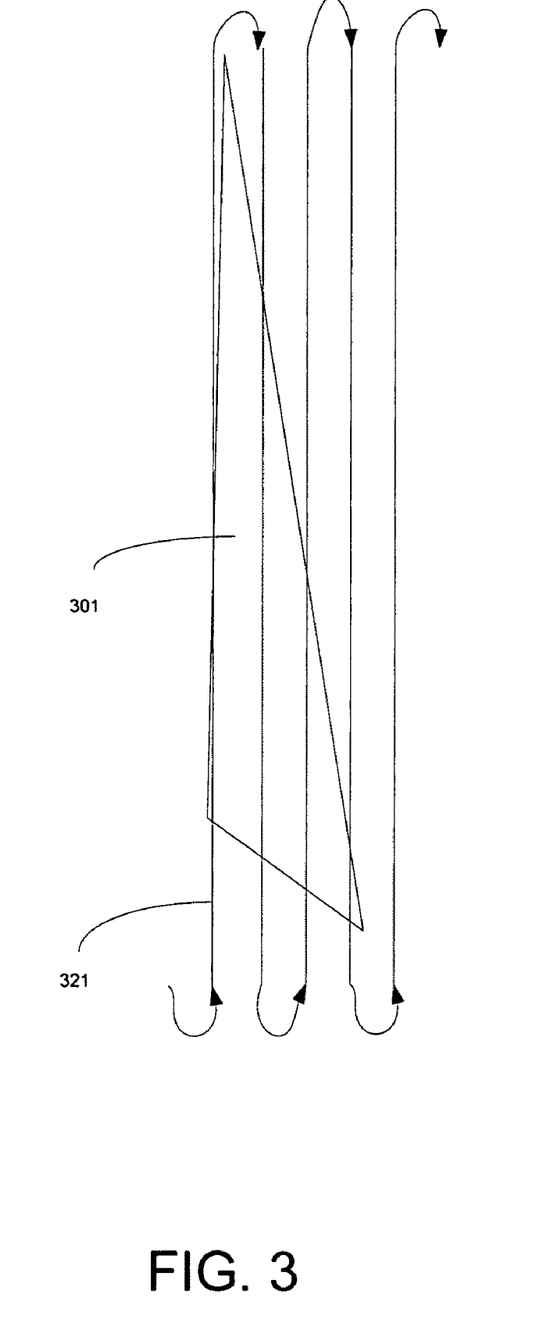
FIG. 3 shows a diagram of a triangle against a rasterization pattern for a raster unit of the GPU in accordance with one embodiment of the present invention.

FIG. 3 shows a diagram of a triangle 301 against an exemplary rasterization pattern 321 for a raster unit of the GPU 110 in accordance with one embodiment of the present invention. As shown in the FIG. 3 embodiment, a raster unit of the GPU 110 traverses the triangle 301 and stamps out tiles that have at least some coverage with respect to the triangle 301. The resulting tiles are subsequently sent down the graphics pipeline for further processing.

Figure 4:
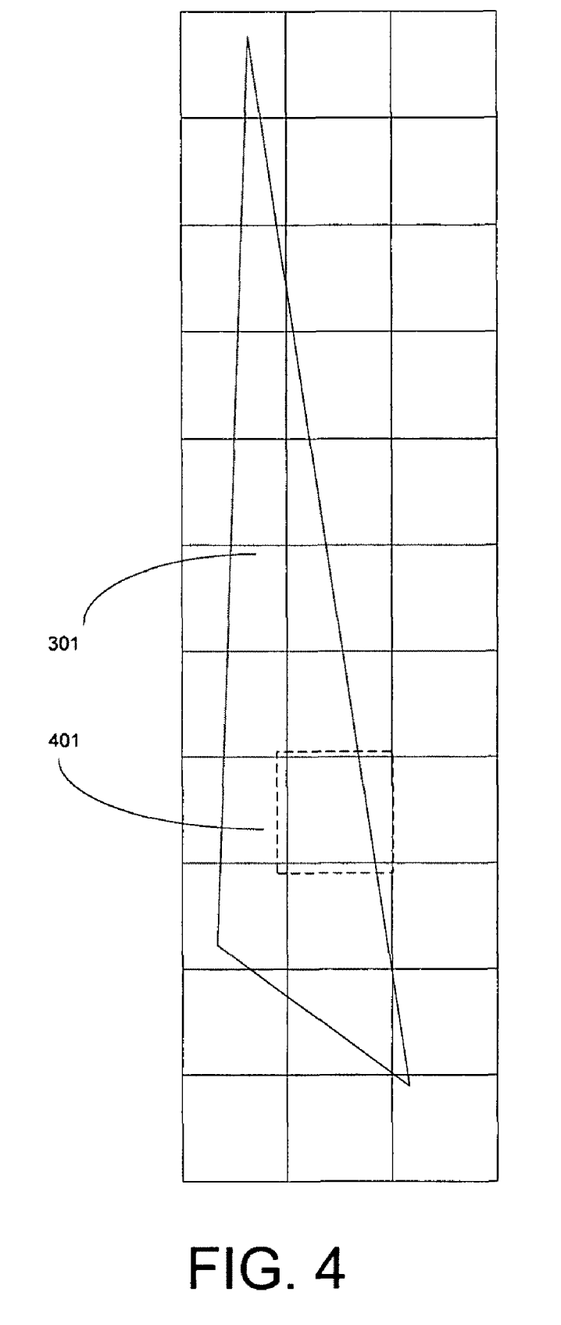
FIG. 4 shows a diagram of the triangle against a grid of tiles as they are examined by the first level rasterization process in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 16×16, 8×8, 4×4, etc.). Thus, in a case where each tile comprises 2×2 pixels, the raster unit of the GPU 110 can stamp out a 4 pixel tile each clock cycle. The generation of such tiles can be considered as a form of coarse rasterization, where comparatively large groups of pixels are considered at one time to quickly determine which pixels of a large screen area (e.g., 1920×1200, 1024×768 etc.) are relevant and which pixels of the screen area can be discarded. The comparatively large tiles can be examined in detail in a subsequent stage, where each pixel of the tile is examined to determine a more fine degree of coverage by the triangle 301.

In this manner, a coarse rasterization is intended to quickly determine which pixels of the screen area relate to a given graphics primitive. Accordingly, groups of pixels (e.g., tiles) are examined at a time in order to quickly find those pixels that relate to the primitive. The process can be compared to a reconnaissance, whereby the coarse raster unit quickly scans a screen area and finds tiles that cover the triangle 301. Thus the pixels that relate to the triangle 301 can be discovered much more quickly than a traditional prior art process which utilizes a single level of rasterization and examines much smaller numbers of pixels at a time, in a more fine-grained manner.

Figure 5:
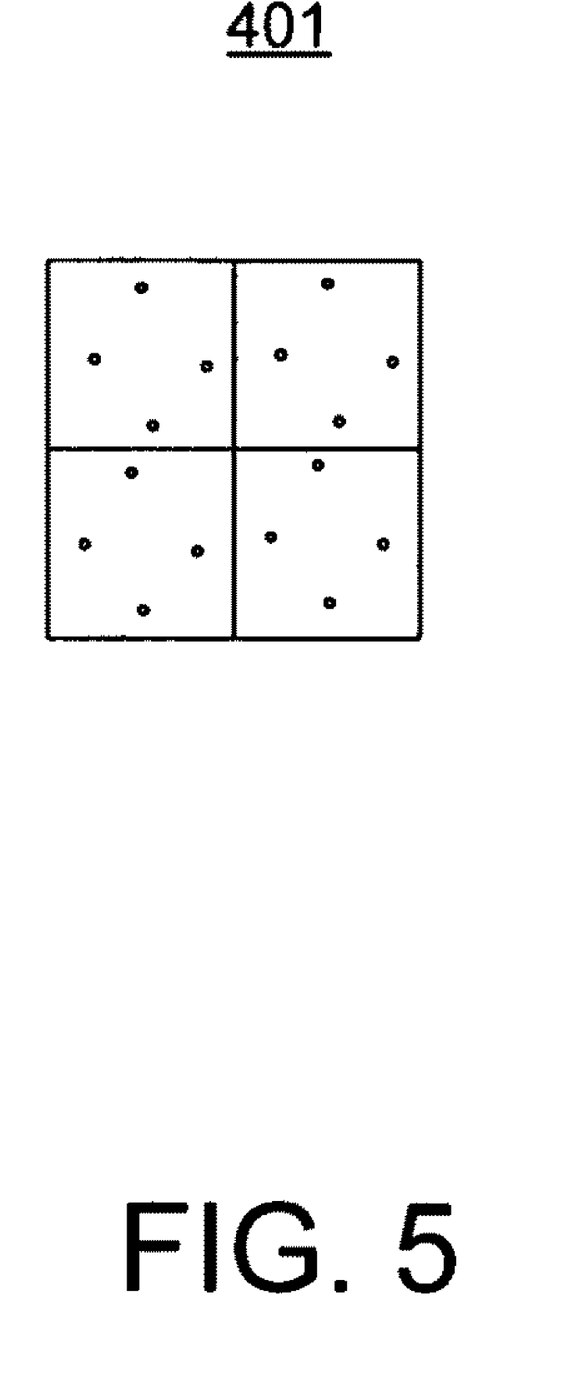
FIG. 5 shows a diagram of the exemplary tile including a plurality of subpixel sample points in accordance with one embodiment of the present invention.

FIG. 5 shows a diagram of the exemplary tile 401 including a plurality of subpixel sample points in accordance with one embodiment of the present invention. As depicted in FIG. 5, the tile 401 includes four pixels, with each pixel including four subpixel sample points.

As described above, received graphics primitives are rasterized to generate a plurality of tiles related to the graphics primitive, where a given tile is related to the graphics primitive if it has at least some degree of coverage by the graphics primitive. To facilitate a more fine degree of coverage determination, subpixel sample points are implemented. Subpixel sample points are used to more precisely determine the area of coverage of a given fragment. Generally, the more subpixel sample points that are covered by a primitive, the larger the pixel area assigned to the fragment. Subpixel sample points are used in anti-aliasing algorithms, such as, for example, virtual coverage anti-aliasing operations.

Figure 6:
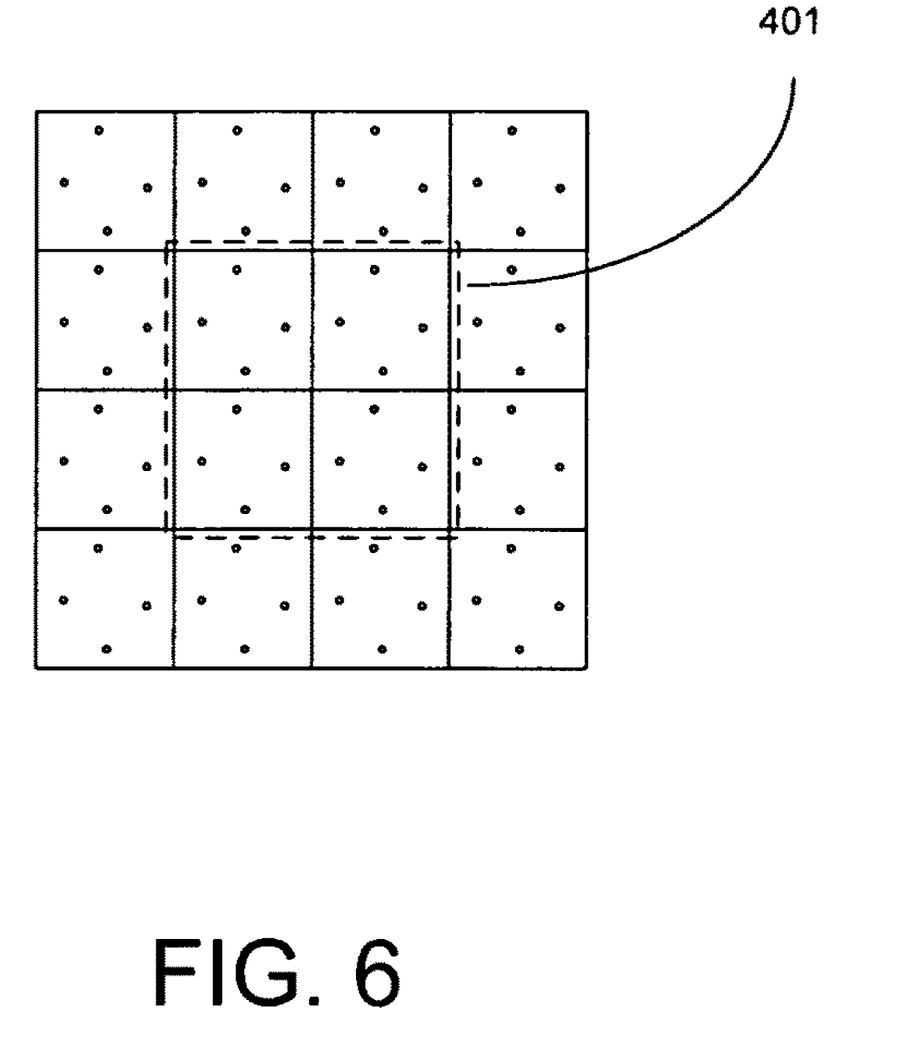
FIG. 6 shows a diagram of the exemplary tile including the neighboring pixels and their associated subpixel sample points in accordance with one embodiment of the present invention.

FIG. 6 shows a diagram of the exemplary tile 401 including the neighboring pixels and their associated subpixel sample points in accordance with one embodiment of the present invention. As depicted in FIG. 6, the exemplary tile 401 is shown by the dotted box. Each of the pixels are shown with their constituent sub pixel sample points, in this case, four sample points per pixel.

Referring to the FIG. 6 embodiment, when the raster stage determines which tiles are related to the primitive (e.g., tile 401), the raster stage also determines a subpixel sample group related to each of the plurality of tiles. In the case of the tile 401, a subpixel sample group related to tile 401 refers to the fact that the values of the subpixel samples of the pixels that are neighboring tile 401 are needed in order to compute pixel attributes for the tile 401. For example, in order to compute depth values for the pixels comprising the tile 401, information from each of the neighboring pixels (e.g., from each of the subpixel samples of the neighboring pixels) must be read from memory. This information is then used to compute the depth values for the pixels comprising the tile 401. When the new depth values are computed, the pixels of the tile 401 are updated by storing the computed information back into memory.

Thus, in a general sense, in order to update all the pixels of the tile 401, information of all the neighboring pixels must be read for memory. Embodiments of the present invention implement an optimized rasterization cache that minimizes the memory bandwidth impact of such a read modify write operations.

Figure 7:
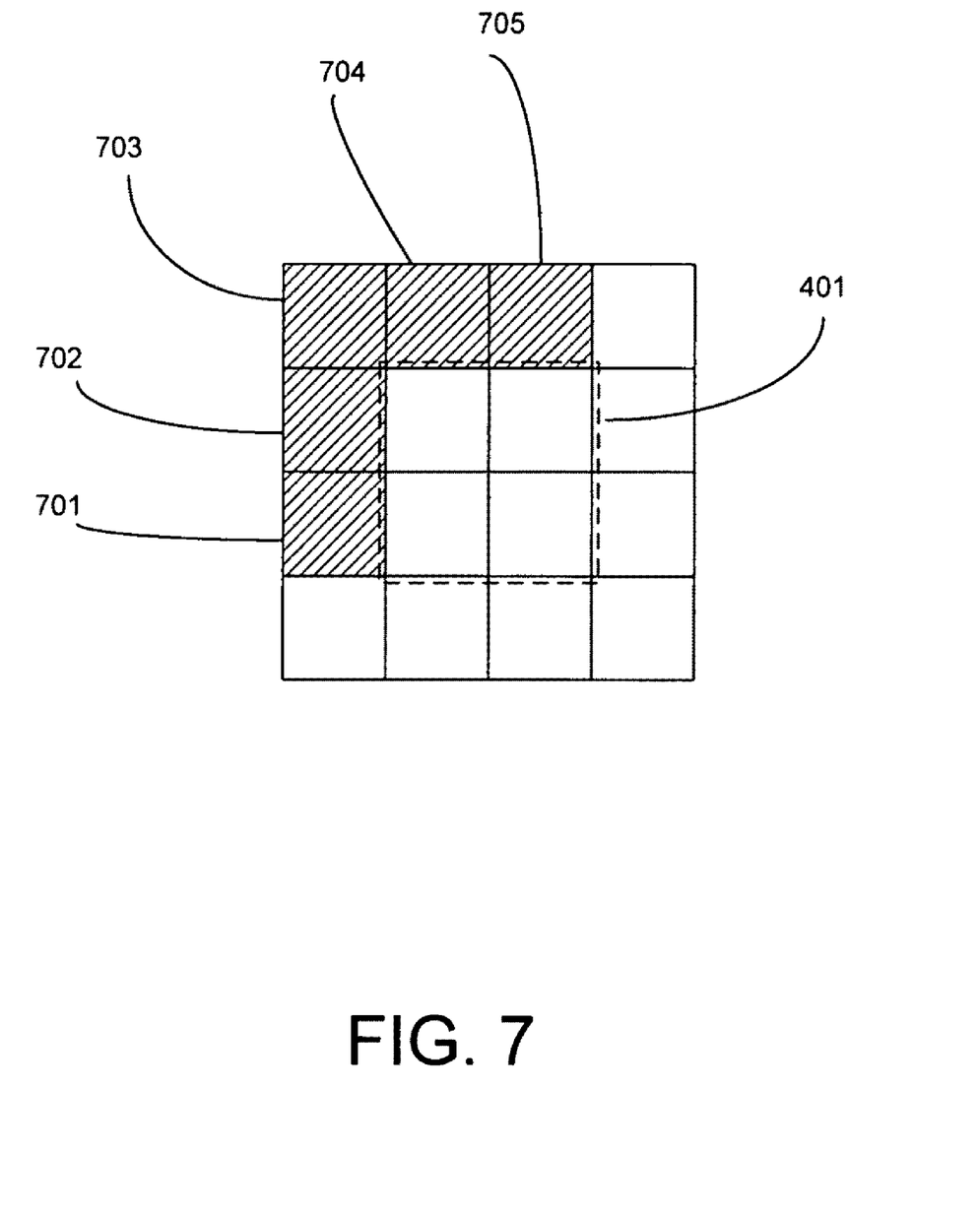
FIG. 7 shows the exemplary tile and a subpixel sample group related to the tile in accordance with one embodiment of the present invention.

FIG. 7 shows the exemplary tile 401 and a subpixel sample group related to the tile 401 in accordance with one embodiment of the present invention. As depicted in FIG. 7, the tile 401 is indicated by the dotted line. The neighboring 12 pixels are also shown. Of the neighboring 12 pixels show in FIG. 7, the pixels 701-705 comprise the subpixel sample group related to the tile 401 and are indicated by their diagonal hashing. For the purposes of clarity and to avoid unnecessarily obscuring aspects of the present invention, the individual subpixel samples are not shown.

The FIG. 7 embodiment illustrates how intelligent decisions are made as to the storing of the tile 401 and its associated related subpixel sample group. The decisions take advantage of the fact that the tile 401 can be stored within memory along with a related subpixel sample group in order to best take a vantage of an optimized traversal algorithm (e.g., traversal pattern 221 of FIG. 2) as implemented by the raster stage. In the present embodiment, the tile 401 is stored as a "3×3" where the tile 401 is stored with the related subpixel sample points of the pixels 701-705.

The raster stage takes advantage of the orientation of the tile 401 and the related pixels 701-705 by implementing the optimized traversal pattern 221. For example, in the present embodiment, the related pixels 701-705 are on top and to the left of the tile 401. To take advantage of this fact, the traversal pattern 221 proceeds from top down and from left to right, as shown in FIG. 2. Thus, using such a pattern, proceeding from top to bottom, as each tile is rasterized, approximately 50% of the data needed to evaluate the tile has been previously accessed during the prior pass. This attribute is advantageously utilized by the rasterization cache of the embodiments of the present invention.

The rasterization cache is designed to take advantage of the fact that the location of the related subpixel sample group with respect to the tile 401 can be controlled to maximize the locality of reference of memory accesses. As each successive tile is rasterized and evaluated (e.g., depth buffering, stencil testing, etc.), a large portion of the needed data is already resident within the rasterization cache and does not need to be fetched again from the frame buffer memory. By utilizing a set of specific optimizations, the benefit provided by the rasterization cache can be further increased. These optimizations are now described.

A primary optimization involves the use of the optimized traversal pattern (e.g., boustrophedonic traversal) as described above. The optimized traversal pattern folds back and forth along a predominant axis, where, for example, the pattern generates all the pixels within a primitive triangle that are on one row from top to bottom, and then the next row bottom to top, and so on. This ensures that an average distance from a generated pixel to recently previously generated pixels is relatively small, and the beneficial impact of the rasterization cache is maximized. The optimized traversal pattern also minimizes the number of "cold starts" which must be undertaken, wherein rasterization commences without any relevant data within the rasterization cache.

Other optimizations involve the manner in which the rasterization cache eviction policy is implemented. For example, embodiments of the present invention produce a comparatively large benefit without requiring an overly large cache size by implementing a carefully planned eviction policy. This policy chooses particular cache lines for eviction when new space is needed.

Figure 8:
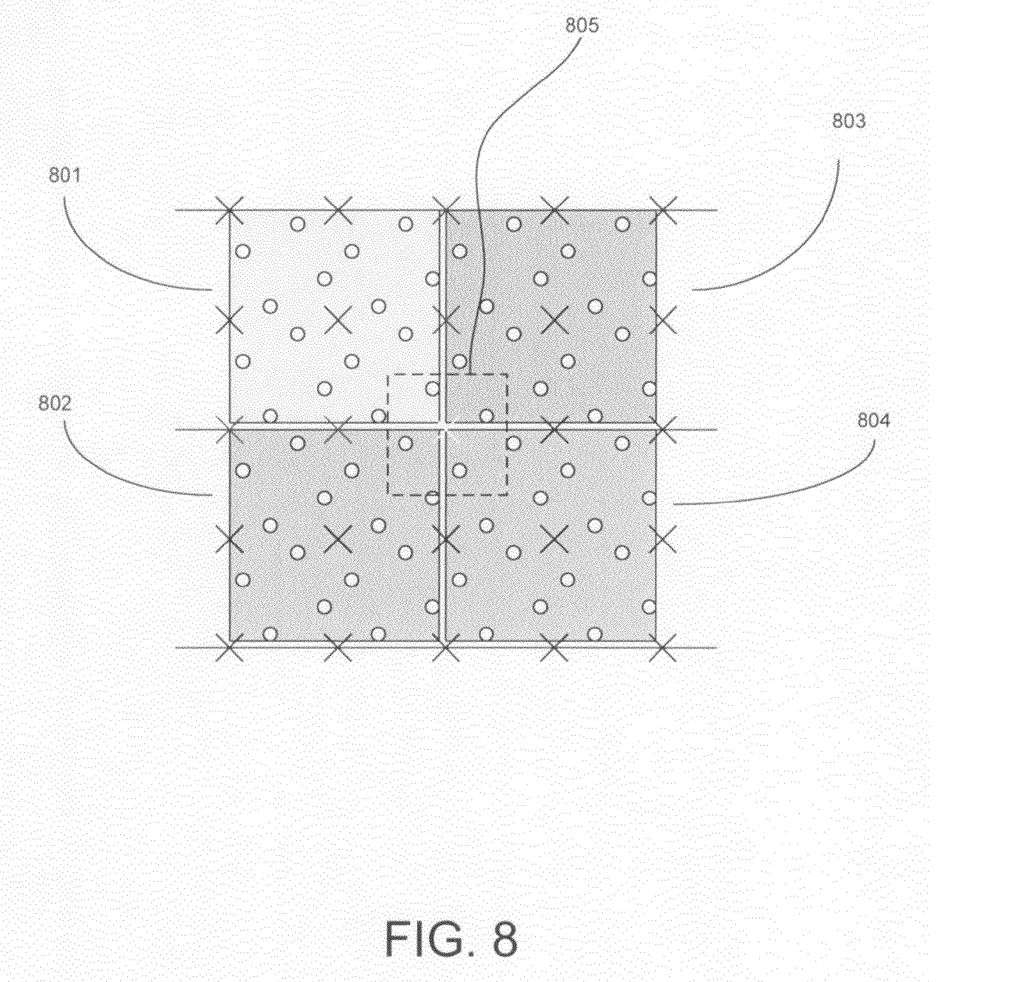
FIG. 8 illustrates the attribute of the rasterization cache whereby the pixels of one tile are shared by two other tiles in accordance with one embodiment of the present invention.

FIG. 8 shows an example where the rasterization cache uses the pixel y-coordinate to select cache lines for replacement in accordance with one embodiment of the present invention. As depicted in FIG. 8, 4 adjacent tiles 801-804 are shown. In this example, each of the tiles 801-804 comprise 2×2 pixels.

In the FIG. 8 embodiment, the rasterization cache uses the pixel y coordinate to select cache lines for replacement. For replacement, wherein the pixel y-coordinate will indicate those cache lines that are not on the same row as the tile that is currently being rasterized and evaluated. This rule takes advantage of the fact that the rasterization pattern predominately moves in a vertical direction, which makes it more likely that an unused cache line will be furthest away in the vertical direction.

FIG. 8 illustrates the attribute of the rasterization cache whereby the pixels of the tile 803 are shared by the tile 801 and tile 803. The pixels of the tile 802 are shared by the tile 801 and tile 802. However, the sample points within the dotted area 805 are shared by all 4 quads. To take advantage of this characteristic, the rasterization cache tries the hardest to keep the tile 803 and sample points 805 in the cache. Next it tries to keep the tile 802 in the cache. Thus, for example, when rasterizing downward, the rasterization cache can take advantage of the fact that the top row of pixels will not be used again and that the pixels of the tile 802 will be used again shortly.

Accordingly, it should be understood that one of the motivations for using the rasterization cache is the fact that to render a 2×2 tile when VCAA is turned on, information that overlaps between the tiles is needed. When VCAA is off, the tiles are all independent and no such overlap occurs. Thus, the rasterization cache provides an exceptional benefit in those situations where a pixel's value is used in rendering its neighbor's values.

In another embodiment, the rasterization cache can use the direction of rasterization to replace cache lines that are furthest away in the direction opposite to direction a rasterization. Thus, for example, the uppermost cache lines can be replaced when the rasterizer is moving downward. Similarly, the lowermost cache lines can be replaced when rasterizer is moving upward. This rule takes advantage of the fact that the rasterizer is less likely to require access to cache lines that it has passed and is moving away from.

In another embodiment, the rasterization cache can incorporate an optimization whereby a single set of tags can be used for multiple surfaces that are stored within the rasterization cache. The multiple surfaces refers to the fact that different types of sampling data are stored within the cache (e.g., depth, stencil, anti-aliasing, etc.). These multiple surfaces, however, are each accessed in the same manner. The rasterization cache can be optimized by using a common tag mechanism to save transistor count and semiconductor die area.

In another embodiment, the rasterization cache can be configured to flush its contents (e.g., clear) between the processing of primitives. For example, once the rasterization of one primitive is finished, the rasterization cache can be cleared prior to the commencement of rasterizing the new primitive. This mechanism can ensure coherence in the rendering process and affording a potential read modify right hazards.

In another embodiment, the rasterization cache is implemented as a read-only cache. This actually takes advantage of the fact that the rasterization cache can be configured to interface with and function alongside an L2 cache also included within the GPU 110. Hardware for writing back to the frame buffer memory can be incorporated within the L2 cache. This allows the hardware of the rasterization cache to be streamlined and fast functioning, and takes advantage of the fact that the rasterization cache can be flushed to maintain coherence.

Figure 9:
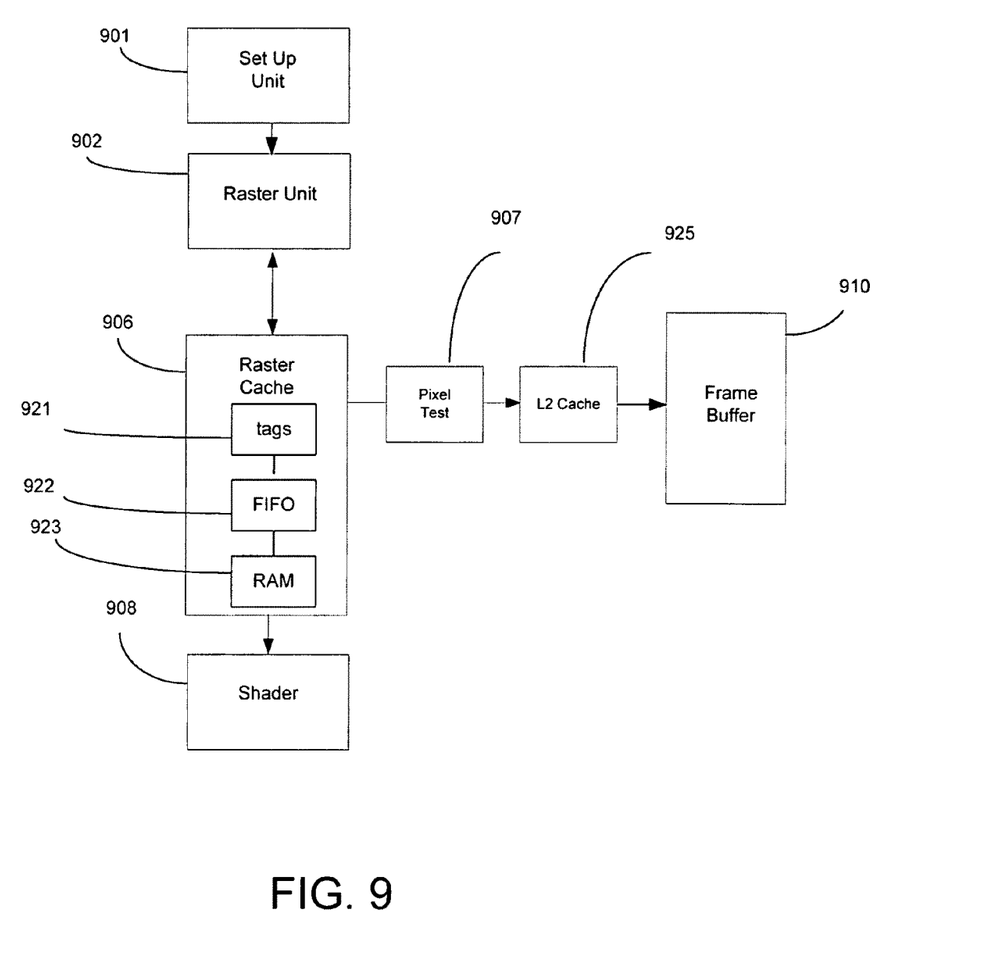
FIG. 9 shows a diagram depicting a graphics pipeline in accordance with one embodiment of the present invention.

FIG. 9 shows a diagram depicting a graphics pipeline in accordance with one embodiment of the present invention.

The FIG. 9 embodiment illustrates exemplary internal components comprising a pipeline of the GPU 110. As shown in FIG. 9, the GPU 110 includes a setup unit 901 and a rasterizer unit 902. Generally, the set up unit 901 functions by converting descriptions based on vertices to descriptions based on edge descriptions. The rasterizer unit 902 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

The raster cache 906 includes a tag unit 921, a FIFO 922, and a RAM 923. The tag unit 921 is used to keep track of which particular pixel data is within the RAM 923. The RAM 923 provides the actual storage for the pixel data. The FIFO 922 keeps track of in-flight memory access requests and functions by hiding the latency between the requests of data and the actual return of the data.

The pixel test unit 907 is coupled to receive the tiles generated by the raster unit 902. The pixel test unit 907 functions by performing a number of different parameter evaluation processes on the pixels comprising the tiles received from the raster unit 902. The parameter evaluation process can be one of the number of different evaluation processes, or pixel tests, which determine the degree to which the tiles from a given primitive influence pixel colors in the frame buffer 910. For example, in one embodiment, the parameter evaluation process can be a depth evaluation process, where, for example, depth values for the tiles passed from the raster unit 902 are tested against the depth values for those pixels are already residing within the frame buffer 910. Those pixels which are occluded by primitives already rendered into the frame buffer can be discarded.

Similarly, in one embodiment, the parameter evaluation process can be a transparency evaluation, where a transparency value for the tiles passed from raster unit 902 are tested against the pixels already in the frame buffer. Those pixels which have 100% transparency will have no effect on the colors already rendered into the frame buffer and can be discarded.

In yet another embodiment, the parameter evaluation process can be a stencil evaluation, where a stencil is processed against the pixels comprising the primitive. Those pixels which are stenciled out by the stencil process will not be rendered into the frame buffer and can be discarded.

In each case, the objective is to identify pixels of tiles which will not ultimately be drawn into the frame buffer 910 and discard them prior to transmission to the shader unit 907 to save processing bandwidth. For example, in a case where the parameter comprises a depth value, the objective is to identify those tiles which are behind other primitives, or are otherwise occluded, and discard them prior to transmission to a subsequent stage of the pipeline.

The L2 cache 925 functions by providing a larger amount of memory for storing pixel data in comparison to the raster cache 906. The L2 cache 925 also includes logic for maintaining coherence between the frame buffer 910 and the other memories of the graphics pipeline.

With respect to the frame buffer 910, it should be noted that the frame buffer 910 can be implemented as a portion of the local graphics memory 114 shown in FIG. 1, or alternatively, as a portion of the system memory 115.

The shader unit 908 performs pixel shader processing for each of the pixels comprising the tiles. The shader unit 908 typically receives the tiles in a piecemeal manner as pixel "quads" (e.g., groups of 2×2 pixels) and operates on the quads in accordance with the parameters iterated across each of the pixels.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a graphics pipeline of a graphics processor, a method for caching pixel data, comprising:
   receiving a graphics primitive for rasterization in a raster stage of a graphics processor;
   rasterizing the graphics primitive to generate a plurality of tiles of pixels related to the graphics primitive;
   determining a subpixel sample group related to each of the plurality of tiles;

storing the plurality of tiles and the corresponding plurality of subpixel sample groups into a frame buffer memory; and storing a set of tiles and a set of corresponding subpixel sample groups from the frame buffer memory in a rasterization cache, wherein the rasterization cache is configured for access by the raster stage to enable a subpixel anti-aliasing operation.

2. The method of claim 1, wherein the subpixel anti-aliasing operation is a virtual coverage anti-aliasing operation.

3. The method of claim 1, wherein each of the plurality of tiles comprises four pixels.

4. The method of claim 3, wherein each of the corresponding subpixel sample groups comprises nine pixels, wherein each of the nine pixels includes a plurality of subpixel sample points.

5. The method of claim 1, wherein the set of tiles and the set of corresponding subpixel sample groups that are stored in the rasterization cache are selected to maximize access to the rasterization cache as opposed to access to the frame buffer memory during the subpixel anti-aliasing operation.

6. The method of claim 5, wherein the raster stage is configured to rasterize the graphics primitive in an alternating pattern to avoid accesses to corresponding subpixel sample groups that are not stored in the rasterization cache.

7. The method of claim 5, wherein the raster stage is configured to use a pixel y coordinate from each of the plurality of tiles to select a cache line of the rasterization cache for replacement.

8. The method of claim 5, wherein the raster stage is configured to use a direction of rasterization to select a cache line of the rasterization cache for replacement.

9. The method of claim 5, wherein the rasterization cache is configured to use a common set of tags for multiple surfaces that are stored within the rasterization cache.

10. The method of claim 5, wherein the raster stage is configured to clear the rasterization cache after completing the rasterization of the graphics primitive and before beginning the rasterization of a new graphics primitive.

11. The method of claim 1, wherein the rasterization cache is a read-only cache.

12. The method of claim 11, wherein the rasterization cache is configured to interface with an L2 cache that is coupled to the frame buffer memory.

13. A GPU (graphics processor unit), comprising:
a set-up unit for generating polygon descriptions of a graphics primitive;
a rasterizer unit coupled to the set-up unit for generating a plurality of tiles of pixels related to the graphics primitive and determining a subpixel sample group related to each of the plurality of tiles; and
a rasterization cache coupled to the rasterizer unit for storing a set of tiles and a set of corresponding subpixel sample groups, wherein the rasterization cache is configured for access by the rasterizer unit to enable a virtual coverage anti-aliasing operation.

14. The GPU of claim 13, wherein the set of tiles and the set of corresponding subpixel sample groups that are stored in the rasterization cache are selected to maximize access to the rasterization cache as opposed to access to the frame buffer memory during the subpixel anti-aliasing operation.

15. The GPU of claim 13, wherein the raster stage is configured to rasterize the graphics primitive in an alternating pattern to avoid accesses to corresponding subpixel sample groups that are not stored in the rasterization cache.

16. The GPU of claim 13, wherein the raster stage is configured to use a pixel y coordinate from each of the plurality of tiles to select a cache line of the rasterization cache for replacement.

17. The GPU of claim 13, wherein the raster stage is configured to use a direction of rasterization to select a cache line of the rasterization cache for replacement.

18. A computer system, comprising:
a system memory;
a central processor unit coupled to the system memory; and
a graphics processor unit communicatively coupled to the central processor unit;
a set-up unit within the graphics processor unit for generating polygon descriptions of a graphics primitive;
a rasterizer unit coupled to the set-up unit for generating a plurality of tiles of pixels related to the graphics primitive and determining a subpixel sample group related to each of the plurality of tiles; and
a rasterization cache coupled to the rasterizer unit for storing a set of tiles and a set of corresponding subpixel sample groups, wherein the rasterization cache is configured for access by the rasterizer unit to enable a virtual coverage anti-aliasing operation, and wherein the set of tiles and the set of corresponding subpixel sample groups that are stored in the rasterization cache are selected to maximize access to the rasterization cache as opposed to access to the frame buffer memory during the virtual coverage anti-aliasing operation.

19. The computer system of claim 18, wherein the raster stage is configured to rasterize the graphics primitive in a boustrophedonic pattern to avoid accesses to corresponding subpixel sample groups that are not stored in the rasterization cache.

20. The computer system of claim 18, wherein the raster stage is configured to use a pixel y coordinate from each of the plurality of tiles to select a cache line of the rasterization cache for replacement, and wherein the raster stage is configured to use a direction of rasterization to select a cache line of the rasterization cache for replacement.

* * * * *